United States Patent [19]

Auzolat et al.

[11] Patent Number: 4,677,333

[45] Date of Patent: Jun. 30, 1987

[54] BRUSH HOLDER MOUNTABLE IN RECESS OF PERIPHERAL WALL OF ELECTRIC MACHINE

[75] Inventors: Jean P. Auzolat, Paris; Georges Gagneux, Chatellerault, both of France

[73] Assignee: Equipements Automobiles Marchall, Issy-les-Moulineaux, France

[21] Appl. No.: 785,535

[22] Filed: Oct. 8, 1985

[30] Foreign Application Priority Data

Oct. 9, 1984 [FR] France ............................ 84 15461

[51] Int. Cl.$^4$ ............................ H02K 13/10

[52] U.S. Cl. ............................ 310/239; 310/71

[58] Field of Search ............ 310/89, 242, 245, 239, 310/247, 71

[56] References Cited

U.S. PATENT DOCUMENTS

| | | | |
|---|---|---|---|
| 2,774,894 | 12/1956 | Antonidis et al. | 310/71 |
| 2,802,958 | 8/1957 | Curley | 310/71 |
| 3,012,159 | 12/1961 | Druesedow | 310/71 |
| 3,283,186 | 11/1966 | Perry | 310/239 |
| 4,041,339 | 8/1977 | Huber et al. | 310/239 |
| 4,110,651 | 8/1978 | Fagan | 310/239 |

FOREIGN PATENT DOCUMENTS

| | | | |
|---|---|---|---|
| 55-68844 | 5/1980 | Japan | 310/239 |

*Primary Examiner*—Patrick R. Salce
*Assistant Examiner*—D. L. Rebsch
*Attorney, Agent, or Firm*—Brisebois & Kruger

[57] ABSTRACT

The brush holder for an electric machine, which may be either a motor or a generator, and comprises a stator and a rotor provided with a collector ring against which there bears at least one electrically conductive carbon brush, in a housing of the brush holder orientated substantially radially in the stator of the machine. Elastic are between the brush and a bearing surface formed by the end plate of the brush holder housing, said elastic being capable of pressing the brush against the collector ring. The bearing surface for the elastic is situated radially outwardly of the stator beyond the internal surface of the peripheral wall of the electrical machine.

12 Claims, 8 Drawing Figures

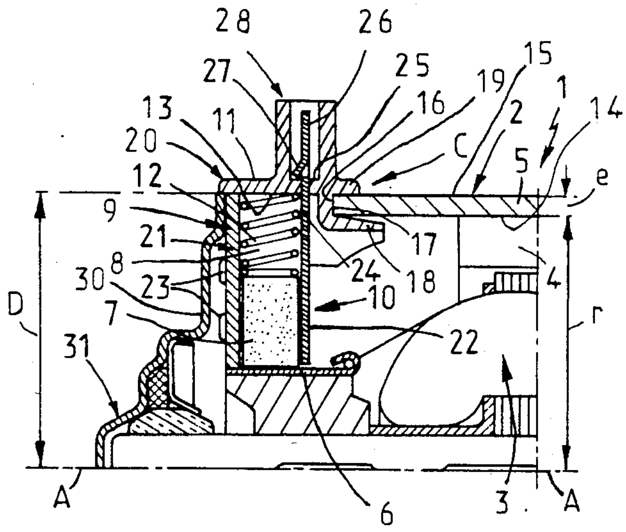
FIG. 1
FIG. 2
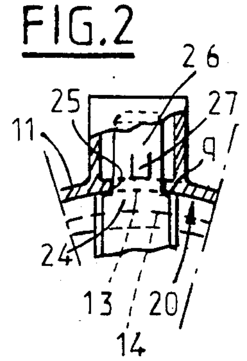
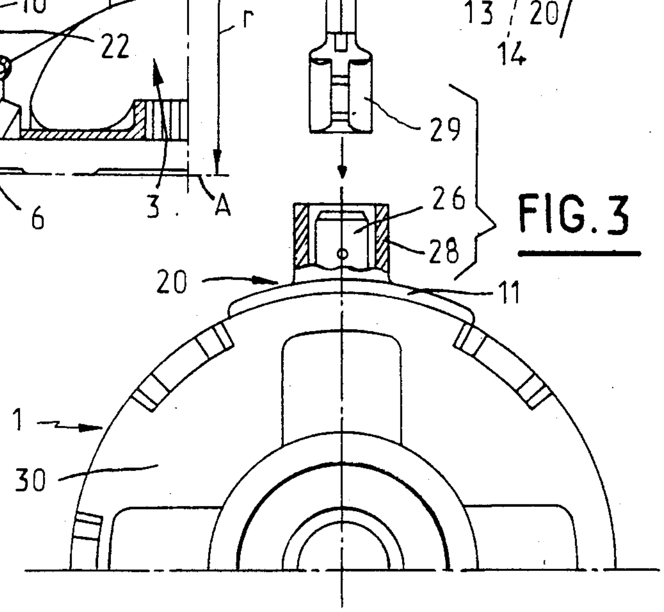
FIG. 3
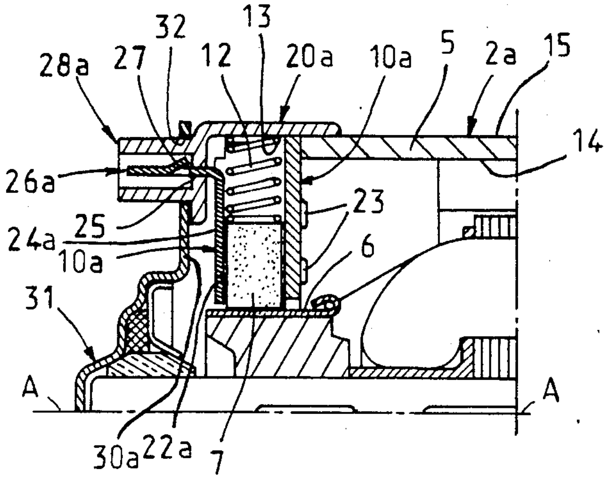
FIG. 4

BRUSH HOLDER MOUNTABLE IN RECESS OF PERIPHERAL WALL OF ELECTRIC MACHINE

FIELD OF THE INVENTION

The invention relates to a brush holder for an electric machine, which may be either a motor or generator, of the kind comprising a stator and a rotor movably mounted in the stator, the rotor being provided with a collector ring against which bears at least one brush which is formed in particular by an electrically conductive carbon brush. This brush is disposed in a brush holder housing orientated substantially radially in the stator and provided with an elastic means disposed between the brush and a bearing surface formed in particular by the bottom of the housing. This elastic means is capable of pressing the brush against the collector ring.

It is known that the brushes of electric machines are subject to rather rapid wear and must be replaced relatively frequently. Moreover, the operations of assembling the brush holder and its mounting are relatively delicate.

OBJECT OF THE INVENTION

The primary object of the invention is to provide a brush holder which would make it possible to increase the brush life.

It is a further object of the invention to provide a brush holder which is of an economical and rugged construction and is easy to mount.

SUMMARY OF THE INVENTION

In accordance with the invention, a brush holder for an electric machine of the kind defined above is characterised in that the bearing surface for the elastic means is situated radially outwardly beyond the internal surface of the peripheral wall of the electric machine.

Preferably, this bearing surface is situated, in the radial direction, at least in the vicinity of the external surface of the peripheral wall of the electric machine.

It is thus possible to increase the length of the brush, for instance, by a distance corresponding to the thickness of the wall, which makes it possible to increase the duration of the life of the brush.

Advantageously, the brush holder is mounted in an opening in the peripheral wall of the electric machine. Generally, this opening is provided at one longitudinal end of the peripheral wall and forms a cut-out.

The brush holder may comprise means for fastening it to the peripheral wall of the electric machine, in particular on the edge of the opening or of the cut-out. These fastening means may comprise a channel or similar feature, provided in particular on three sides of the brush holder, to cooperate with the sides of the cut-out.

The brush holder may have a protuberance on the opposite side to the rotor, this protuberance being intended to be accommodated in a window, preferably of a closed contour, provided in a transverse side intended to constitute an end panel to close the peripheral wall of the electric machine. This window allows the brush holder to be held, at least temporarily, during the assembly of the machine.

The bottom of the housing for the brush carrier, constituting a bearing surface for the elastic means, can be provided on a component which is independent of the portion of the brush holder serving as guide for the brush. Advantageously, this component comprises means for fastening to the peripheral wall of the stator of the electric machine.

The bottom of the brush holder, formed in particular by the said independent component, is made of an electrically insulating material and is provided with an outwardly projecting portion surrounding an electrically conductive strip to form a radial or axial connector.

The said strip can pass through an opening cut in the side of the connector and can have a narrower end zone provided with an elastic hook so that after the said end zone has been engaged in the above-mentioned opening, the side of the connector is gripped between the hook and shoulders formed at the base of the narrower end zone of the strip.

The brush can be electrically connected to a connection terminal by a flexible conductor wire.

The housing for the brush can open out on the side of the rotor along a longitudinal slot allowing the flexible conductor wire to pass, this wire passing through the brush holder so as to emerge on the opposite side to the rotor.

The invention also concerns an electric machine fitted with at least one brush holder such as defined above.

BRIEF DESCRIPTION OF THE DRAWINGS

Apart from the objects and advantages set out above, the invention consists of certain other features which will be discussed in greater detail below, with reference to particular embodiments described in detail with reference to the attached drawings but which are in no way restrictive.

FIG. 1 is a partial axial half cross-section of an electric machine provided with a brush holder in accordance with the invention;

FIG. 2 is a view from the left in relation to FIG. 1 of a detail of the brush holder, with portions cut away;

FIG. 3 is a half elevation of the machine viewed from the left of FIG. 1;

FIG. 4 is an axial half cross-section illustrating a variant of the embodiment;

DESCRIPTION OF THE PREFERRED EMBODIMENT

Figure 5:
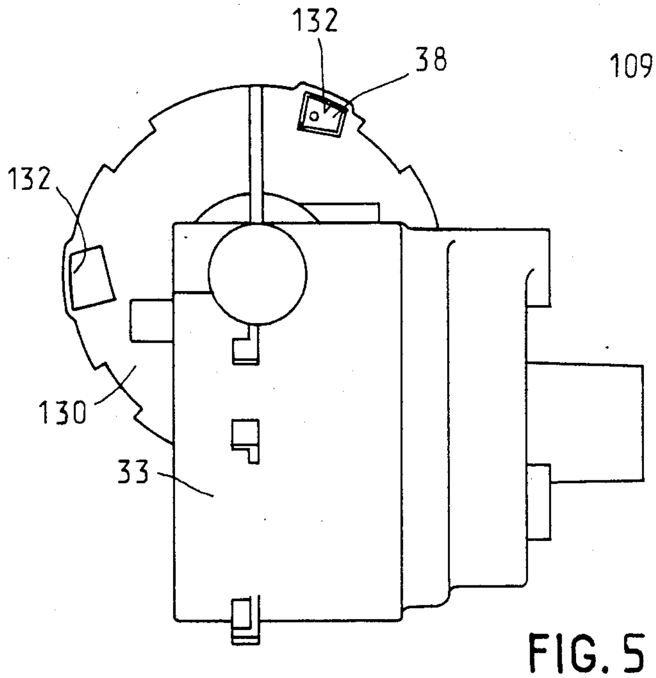
FIG. 5 is an elevational view of an end plate intended to close the stator of an electric machine, this end plate being integral with a casing intended to accommodate a reduction gear.
Figure 6:
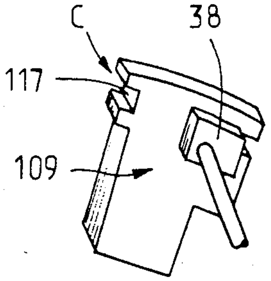
FIG. 6 is a perspective view of a variant of the embodiment of the brush holder.
Figure 7:
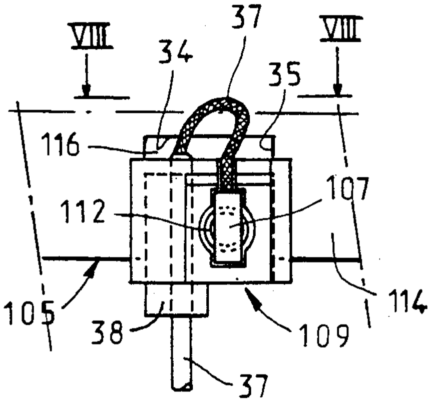
FIG. 7 is a sectional view, taken along line VII—VII of FIG. 8, of the brush holder as it is being introduced into a cut-out.
Figure 8:
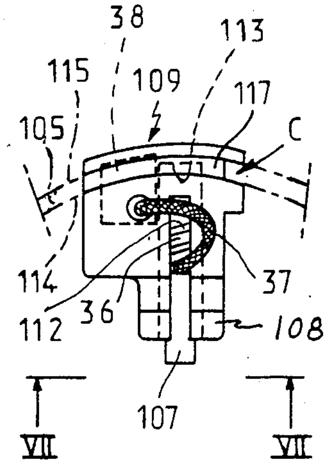
FIG. 8 is a sectional view taken along the line VIII—VIII, of FIG. 7.

Referring now to the drawings, FIGS. 1 to 3 in particular show an electric machine constituted by a motor 1 comprising a stator 2 and a rotor 3 which is rotatably mounted in the stator. The stator 2 comprises pole pieces 4 and a peripheral wall 5 forming a cylindrical shell or casing for the motor.

The rotor 3 is fitted with a collector ring 6 against which bears at least one electrically conductive brush 7, in this case a carbon brush. This brush 7 may have the shape of a right angled parallelepiped.

The brush is disposed in the housing 8 of a brush holder 9 orientated substantially radially in the stator 2. This brush holder 9 comprises (a) a portion 10 delimiting the housing 8 proper and serving as a guide for the sliding of the brush 7 and (b) an end plate 11. The cross-section of the portion 10 is in the same shape as that of the brush 7.

The brush holder 9 is provided with an elastic means 12, in this case a generally helical compression spring, disposed between a bearing surface or seat 13 and the brush 7 so as to press the brush against the collector ring 6.

In accordance with the invention, the bearing surface 13 is situated radially outwardly beyond the internal surface 14 of the peripheral wall 5 of the electric machine, namely the motor. To illustrate this arrangement properly, the surface 13 has been extended in FIG. 1 in dot dash lines towards the left of the Figure. It is thus clearly apparent that the bearing surface 13 is situated at a distance D from the axis A—A of the machine which exceeds the distance r of the internal surface 14 of the casing 5 from this same axis A—A.

It will immediately become apparent that, with a given elastic means 12, it is possible to increase the dimension of the brush 7 along the radial direction because the surface 13 is further away from the axis A—A than it would normally be.

Preferably the bearing surface 13 is at least as far from the axis A—A, in the radial direction, as is the external surface 15 of the peripheral wall 5, as shown in FIG. 1. More preferably the surface 13 is beyond this surface 15. In that case, the increase in dimension of the brush 7 along the radial direction can at least be equal to the thickness e of the peripheral wall 5.

The brush holder 9 is mounted in an opening 16 of the peripheral wall 5. Generally this opening 16 is provided at one longitudinal end of the wall 5, as viewed in FIG. 1, so as to form an open cut-out along one side.

The brush holder 9 comprises means C for fastening it to the peripheral wall 5, in particular at the edge of the cut-out 16.

These fastening means C may comprise a channel profile 17, or a groove, or similar, provided on three sides of the brush holder to cooperate with the three sides of the cut-out 16. The channel profile 17 may be arranged to be catch-engaged on the wall 5. For example, the side 18 of the channel profile 17 which is situated inside the wall 5 may be longer than the other side 19 which is situated on the outside. The internal surfaces of the two sides 18, 19 may slightly converge so as to ensure a mechanical grip of the wall 5 when the channel profile 17 is completely driven into the cut-out 16.

Provision may be made for the end plate 11 of the brush holder 9 to be on a component 20 made in particular of an electrically insulating plastic material and independent of the part 10 serving to guide the brush 7. However, the component 20 and the part 10 will be mechanically interconnected. The fastening means C, in particular the channel profile 17, will advantageously be provided on this component 20.

The part 10 serving to guide the brush 7 may be formed by the assembly of an electrically insulating plate 21 and a metallic brush guide 22 with a channel-shaped cross-section; this brush guide 22 can be fixed to the plate 21 by crimping at 23. The brush guide 22 is extended radially outwardly by a metallic strip 24 intended to form an electric connector. As may be seen in FIGS. 1 and 2, the strip 24 passes through an opening 25 in the component 20 and has a smaller end zone 26 provided with an elastic hook 27. This hook can be formed by a strip partly cut out in the zone 26 and remaining contiguous with this zone at one side, the said strip being deformed out of the plane of zone 26 to form the hook 27. The transverse cross-section of the opening 25 is the same as that of the end zone 26 and, in particular, the width of the opening 25 is equal to the thickness of the zone 26, except for the operating play. Thus, as this end zone 26 becomes engaged in the opening 25, the hook 27 will firstly be elastically retracted and then, after exiting the opening, the hook 27 will again spring outwardly. The wall of the component 20 will therefore be gripped between the hook 27 and the shoulders q (FIG. 2) formed at the base of the zone 26. This ensures the mechanical connection of the part 10 to the component 20.

The end plate 11 of the brush holder, in particular when it is formed by the component 20, is advantageously provided with an outwardly projecting portion 28 surrounding the end zone 26 of the strip 24 to form an electric connector to which a terminal 29 (FIG. 3) may be fitted. The portion 28 is made of an electrically insulating material. Where an independent component 20 is used, this portion 28 may form an integral part of that independent component. The electric connection between the strip 24 and the brush 7 is ensured by the rubbing of the brush against the brush guide 22.

In the embodiment of FIGS. 1 to 3, the portion 28 projects radially outwardly, in the same way as does the zone 26, to provide a radial connector.

At its end situated on the left in FIG. 1, the peripheral wall 5 is closed transversely by a transverse side 30 constituting an end plate and provided with a bearing 31 for the motor shaft.

FIG. 4 shows a variant of the embodiment wherein elements identical to, or performing the same functions as, elements already described with reference to FIGS. 1 to 3 are indicated by the same reference numerals followed if necessary, by the letter a; such components are not again described in detail.

In the FIG. 4 variant of the machine, the connector formed by the portion 28*a* and the end zone 26*a* of the strip is orientated parallel to the direction of the axis A—A; this connector is therefore an axial one, in contrast to the radial connector of FIGS. 1 to 3. The end zone 26*a* of the metallic strip 24*a* is bent at right angles. The portion 28*a*, which constitutes an axial protuberance of the motor casing, passes through a closed perimeter window 32 in the transverse side 30*a*. The independent component 20*a* may be held by the cooperation of this portion 28*a* with the closed perimeter window 32 without the need for a channel profile similar to the channel profile 17 of FIG. 1.

It is clear that the brush holder 9, instead of being made of several components 10, 20 or 10*a*, 20*a* as shown in FIGS. 1 to 4, could be made as an integral member.

FIGS. 5 to 8 relate to such an embodiment. The reference numerals used to indicate the various elements in FIGS. 5 to 8 increased by 100 relative to the reference numerals used in FIGS. 1 to 3 to designate an identical element, or one performing a similar function.

FIG. 5 shows the transverse side 130 intended to close the open end peripheral wall of a motor casing, this side 130 being contiguous to a casing 33 intended to accommodate a reduction gear train driven by the motor output shaft. The side 130 and the casing 33 may be made integrally of a cast light-weight alloy.

The brush holder 109 (see in particular FIGS. 6 to 8) may be made of a single component, in particular of a moulded plastic material. The bearing surface 113 (FIG. 8) of the elastic means 112 is situated, in the radial direction, substantially at the level of the external surface 115 of the peripheral wall 105 of the motor. The means C for fastening the brush holder 109 in place comprise the channel profile or groove 117 extending over three of the sides of the brush holder 109 whose general configuration is substantially that of a right angled parallelepiped. On the front of the brush holder 109, facing towards the wall 105 (see FIG. 8), the channel profile 117 has the shape of a circular arc capable of cooperating with the circular arcuate edge 34 (FIG. 7) of the cut-out 116 provided at the end of the wall 105. On the two other lateral sides (see FIG. 6), the portions of the channel 117 are rectilinear so as to cooperate with the rectilinear edges 35 (FIG. 7) of the rectangular cut-out 116.

The housing 108 for the brush is open, on the side nearer the rotor, along a longitudinal slot 36 which is orientated radially of the electric machine when the brush holder 109 is mounted in the stator thereof. This slot 36 slidably receives a flexible conducting wire 37, surrounded by an insulating cover, to effect electric connection to the brush 107. This wire 37 emerges at the rear of the brush holder, as may be seen in FIG. 6.

Advantageously, the rear transverse side of the brush-holder 109, that is to say the transverse side situated on the side remote from the stator, comprises a protuberance 38 (see in particular FIGS. 6 and 7) which can mechanically be considered as performing a role similar to that of the portion 28*a* of the embodiment of FIG. 4. The side 130 comprises closed contour windows 132 each capable of accommodating the protuberance 38. The wire 37 may advantageously emerge via this protuberance 38.

The engagement of the protuberance 38 in a window 132 holds the brush holder 109 in the radial direction, at least provisionally, during the assembly of the machine. This hold, against the force exerted by the elastic means 112, facilitates assembly because it is possible to let go of the brush holder 109 while ensuring the respective positioning of the transverse side 150 and the peripheral wall 105.

The external contour of the protuberance 38 is advantageously polygonal, especially in the form of a right angled trapezium as may be seen in the drawings. The contour of the window 132 is exactly the same as that of the protuberance 38.

Irrespective of the embodiment adopted, it is possible to increase the dimension of the brush 107 along the radial direction, in relation to the dimension of a standard brush which would be mounted in a brush holder situated radially inwardly of the internal surface of the casing wall 5, 105. The presence of the fastening means C facilitates the positioning of the brush holder. The presence of a protuberance 28*a* or 38, cooperating with a window having a closed contour, also helps to facilitate this assembly operation.

We claim:

1. In a brush holder for an electric machine of the type comprising:

a stator;

a casing having a peripheral wall with an external surface and an internal surface;

a rotor rotatably mounted in the stator for rotation about an axis;

collector means on the rotor; and brush means bearing against the collector means, said brush means comprising at least one electrically conductive carbon brush;

said brush holder being oriented substantially radially of the rotor and comprising, a housing having a bearing surface, elastic means disposed between the bearing surface and the carbon brush to push the brush against the collector means of the rotor, said bearing surface being situated radially outwardly of the rotor at least as far as the external surface of the peripheral wall of the casing, wherein said casing includes recess means in said peripheral wall, said brush holder is mounted in said recess means, and said brush holder comprises means for securing the brush holder to the peripheral wall of the casing on the edge of the recess means.

2. A brush holder according to claim 1 wherein, the stator includes a pole portion within the casing on one side of the brush holder, said brush holder housing includes means defining a longitudinal slot on on the side of the housing nearer the pole portion, to slidable receive a flexible wire slectrically connected to the brush, said wire passing through the brush holder and emerging therefrom on the side of the brush holder housing away form the pole portion.

3. A brush holder according to claim 1, wherein said fastening means comprise channel profile means on three sides of the brush holder to cooperate with the corresponding sides of the recess means.

4. A brush holder according to claim 1, and including a protuberance on the opposite side from the rotor, wherein said recess means comprises a window in a transverse side constituting an end plate to close the peripheral wall of the electrical machine; and wherein said protuberance is intended to be accommodated in said window.

5. A brush holder according to claim 4, wherein said window has a closed perimeter.

6. A brush holder according to claim 1, wherein said housing of the brush holder includes an end plate constituting said bearing surface for the elastic means, and wherein said end plate is provided on a component independent of the part of the brush holder serving to guide the carbon brush.

7. A brush holder according to claim 1, wherein the housing has an end plate made of an electrically insulating material and is provided with a portion projecting outwardly and surrounding an electrically conducting strip forming a connector.

8. A brush holder according to claim 7, wherein said connector extends radially of the electrical machine in which the brush holder is installed.

9. A brush holder according to claim 7, wherein said connector extends axially of the electrical machine in which the brush holder is installed.

10. A brush holder according to claim 7, wherein said connector includes means defining an opening in the side of the connector; wherein said electrically conducting strip passes through said opening; and wherein said electrically conducting strip has an end zone which is narrower than the remainder of said strip to define shoulders at the base of said narrower end zone of the strip and is provided with elastic hook means adapted to grip the connector between the hook and said shoulders after engagement of the said end zone in said opening.

11. A brush holder according to claim 2, wherein, said wire is connected to said brush at a first location radially of the rotor, and emerges from the brush holder at a second location radially outwardly to the first location.

12. An electric machine having electrical current collector means and provided with at least one brush holder according to claim 1.

* * * * *